G. W. BROWN.
Corn-Planter.
No. 1,094.
Reissued Dec. 11, 1860.
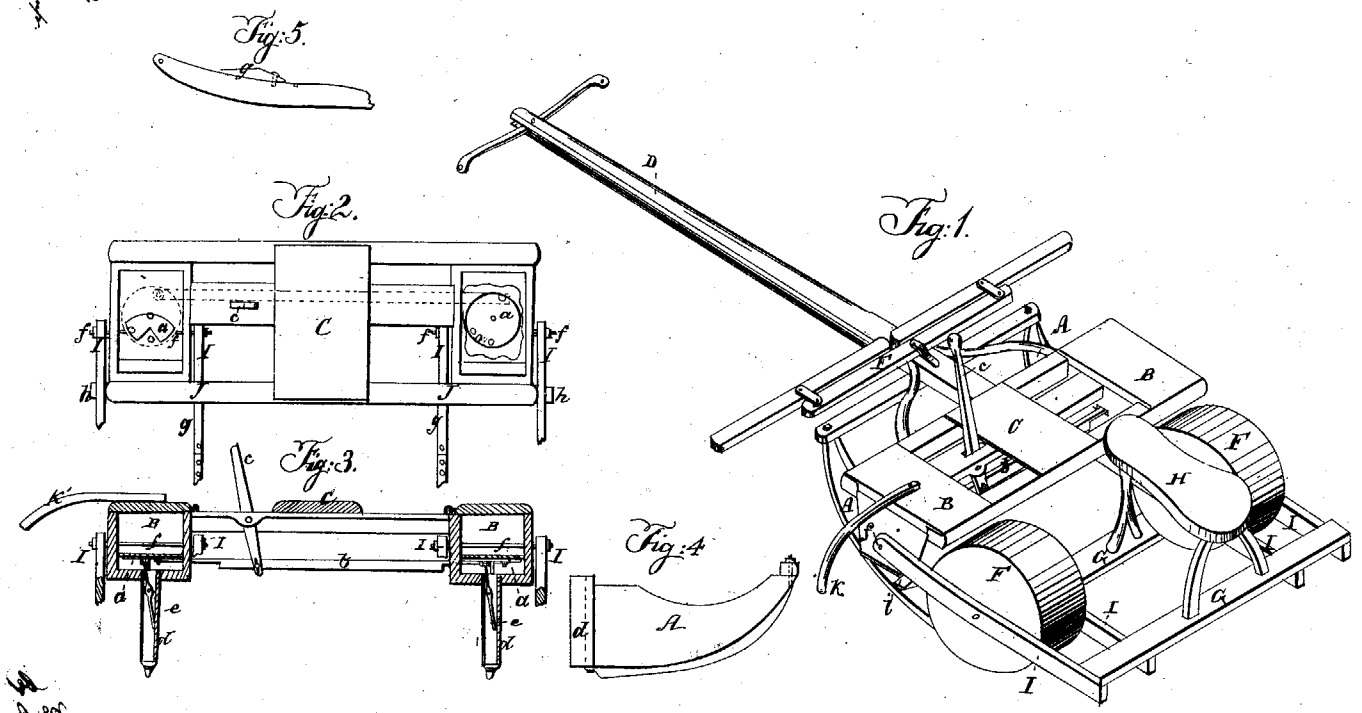
Witnesses.
E. Cohen
John de C. Campe.
Inventor:
Geo W Brown
By atty A R Stoughton
N. PETERS, PHOTO-LITHOGRAPHER, WASHINGTON, D. C.

UNITED STATES PATENT OFFICE.

GEO. W. BROWN, OF GALESBURG, ILLINOIS.

IMPROVEMENT IN SEED-PLANTERS.

Specification forming part of Letters Patent No. 12,811, dated May 8, 1855; Reissue No. 503, dated November 10, 1857; Reissue No. 1,094, dated December 11, 1860.

DIVISION D.

*To all whom it may concern:*

Be it known that I, GEORGE W. BROWN, of Galesburg, in the county of Knox and State of Illinois, have invented certain new and useful Improvements in Seed-Planters; and I do hereby declare that the following is a full, clear, and exact description of the same, reference being had to the accompanying drawings, making a part of this specification, in which—

Figure 1 represents a perspective view of the machine complete. Fig. 2 represents a top plan of the seed hoppers and valves and framework supporting them; Fig. 3, a vertical transverse section through the seed hoppers, valves, and runners or shoes, and showing a device for operating the valves, also representing parts of the frame for supporting them, as well as the marker. Fig. 4 represents a side elevation of one of the runners. Fig. 5 represents the lock or block for defining or adjusting the descent of the rear part of the frame.

Similar letters of reference, where they occur in the several figures, denote corresponding parts of the machine in all the drawings.

In a seed-planting machine upon which the operator or attendant rides, and which has a hinged or yielding joint between the point of the tongue and the wheels which support it upon the ground at a fixed height, and the seeding portion of which can be raised up, let down, or forced into the ground by the person riding on the machine, it is very important that some limit should be given to the necessary motion of one part upon the other to prevent the rear part of the frame from descending so low as to cause it to strike the ground or inconvenience the occupant of the seat thereon. To accomplish this is the object of this part of my invention; and my invention consists in combining with a seed-planting machine that is so made as that the forward part thereof can be raised up onto the supporting-points, to be carried thereby, a lock, block, or stop, which prevents the rear of the frame from descending so low as to strike the ground and inconvenience the occupant of the seat upon said rear part.

To enable others skilled in the art to make and use this part of my invention, I will proceed to describe the same with reference to the drawings.

The front and rear portions of the machine are made up of two separate frames, as it were, the front part containing and carrying the hoppers and seeding devices, and the rear portion having a seat, H, thereon and carried upon a pair of wheels, F F. The pieces I I of the rear frame or part extend over onto the front part, and are pivoted or hinged thereto, as shown at *f f*, &c., so that one part may move upon the other part of said frame. I have shown four of these connecting-pieces I, that extend from the rear to the front part of the framework. The two outer pieces pass in close proximity to the locks, blocks, or stops *h h*, Fig. 2, that are fastened on the front part of the machine, and the two inner pieces may pass under the cross-piece J of the front part, and upon these inner pieces may be placed wedges or their equivalents, *g*, Figs. 2, 5, where they come underneath the cross-piece J, said wedges, if desirable, being adjustable, to give a greater or less purchase or extent of motion of one frame upon the other. Now, suppose the attendant to be upon the seat H, and that he desires to raise up the seeding devices or the front part of the frame, assuming that the point of the pole or tongue D is connected to the horses' necks, and therefore fixed, he may throw or move his weight or person backward, which causes the inner levers I I to raise up the front part of the machine until the stops *h h* come against the outer pieces I I, where it is stopped and held, and so long as the occupant of the seat chooses he can hold and carry it there by means of the raising-levers, the weight of said front part being supported upon the necks of the horses and upon the wheels F. Thus the occupant of the seat H, by means of the hinged or yielding connection between the frames and the lever-connection between them also, can raise or hold up the front part of the machine, or let it down, or force it into the ground, as he may desire, and in doing so the rear part of the machine never drops so low as to strike the ground, the stops *h* preventing that casualty, nor so low as to inconvenience the occupant of the seat H. The point of the tongue D, being connected to the horses' necks, has practically a fixed vertical position above the ground. The rear part of the machine, being supported in the wheels F, which are on the ground, has also a fixed vertical position over the center of the wheels, and between these fixed positions the hinged or jointed connection must be made, so that the occupant of the seat, through the lever-connection between said front and rear portions, can suspend the front part of the machine upon the necks of the team and upon the wheels, and there carry it so long as he may desire, and particularly when he is turning his machine around at the ends of the furrows.

Having thus fully described the nature and object of this part of my invention, what I claim under this patent is—

In combination with a seed-planting machine so made as that the forward part of the machine can be raised up onto the supporting-wheels and there carried, a lock, block, or stop, *h*, which prevents the rear part of the frame from descending so low as to strike the ground or inconvenience the occupant of the seat upon said rear portion of the frame, substantially as and for the purpose described.

GEO. W. BROWN.

Witnesses:

A. B. STOUGHTON,

E. COHEN.